No. 739,670. PATENTED SEPT. 22, 1903.
R. K. GROVE.
VISION TESTING APPARATUS.
APPLICATION FILED OCT. 22, 1902.
NO MODEL.
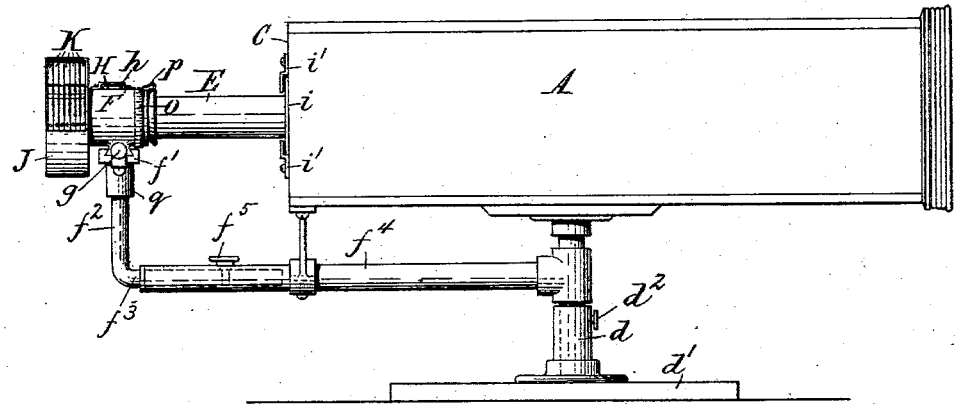
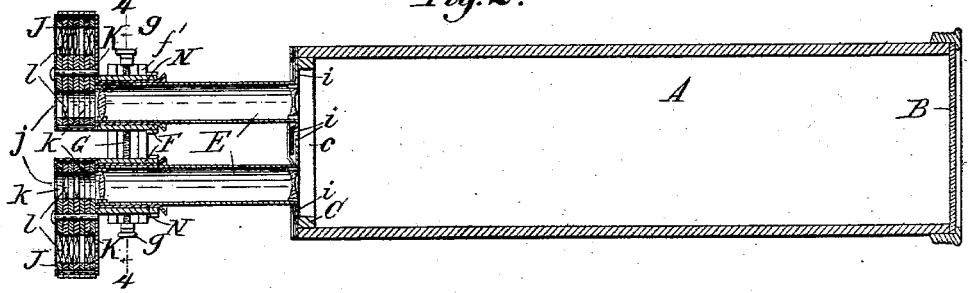
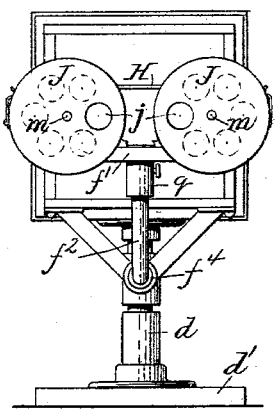
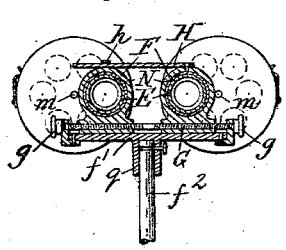
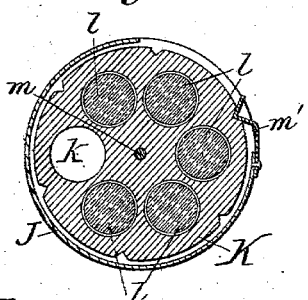
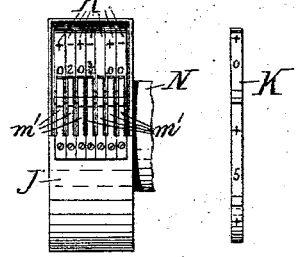
Witnesses:
Albert F. Krauer
J. M. Snyder Jr.
Robert K. Grove,
Inventor,
By Wilhelm & Bonner, Attorneys.

No. 739,670. Patented September 22, 1903.

UNITED STATES PATENT OFFICE.

ROBERT K. GROVE, OF BUFFALO, NEW YORK.

VISION-TESTING APPARATUS.

SPECIFICATION forming part of Letters Patent No. 739,670, dated September 22, 1903.

Application filed October 22, 1902. Serial No. 128,273. (No model.)

*To all whom it may concern:*

Be it known that I, ROBERT K. GROVE, a citizen of the United States, residing at Buffalo, in the county of Erie and State of New York, have invented a new and useful Improvement in Vision-Testing Apparatus, of which the following is a specification.

This invention relates to an optical instrument for testing eyesight and detecting muscular insufficiencies, astigmatism, and other defects of the eyes.

In making the distance test the patient is ordinarily required to read characters on suitable charts through lenses or combinations of lenses, which are placed before his eyes in a suitable frame or support. The charts are placed several feet from the patient, thus requiring a suitably-appointed room of considerable size in which to make the test.

The object of the present invention is to provide a portable instrument of simple, inexpensive, and compact construction adapted for making the distance, as well as the reading, astigmatism, and other tests.

In the accompanying drawings, Figure 1 is a side elevation of an instrument embodying the invention. Fig. 2 is a horizontal longitudinal section thereof. Fig. 3 is a front elevation. Fig. 4 is a transverse section in line 4 4, Fig. 2. Fig. 5 is an enlarged transverse section of one of the lens-holders. Fig. 6 is an enlarged side elevation of the lens-holder shown in Fig. 5. Fig. 7 is an enlarged side elevation of one of the lens-disks.

Like letters of reference refer to like parts in the several figures.

A represents a close or dark box or case, which may be of any suitable form and material and which is supported in a substantially horizontal position. The rear end of the case is closed by a light screen or plate B, of translucent or partially-transparent material—such, for instance, as ground glass. The inner surface of the screen is provided with suitable letters, characters, or devices, which are to be viewed by the patient when testing his eyes. The screen is preferably detachably mounted on the case in any suitable manner, so that it can be removed and replaced by other screens. The opposite end of the box or case is closed by a vertical end wall C, which is provided with a transverse horizontal opening or slot $c$. The box or case is mounted on any suitable standard or support adapted to hold it at a convenient elevation for testing a person's eyes. In the construction shown the box is carried by an upright standard, the lower end of which slidably engages in a tubular socket-piece $d$ on a base $d'$.

$d^2$ represents a set-screw for securing the standard at different heights in the socket-piece.

E represents two tubes, which are arranged at the front end of the box or case opposite the horizontal slot $c$ therein. Each tube is provided with a suitable combination of lenses adapted to project the characters, letters, or devices on the screen B to the required distance to make the distance test. Two tubes are shown in order that both eyes may be tested with greater facility and convenience; but a single tube may be employed, if preferred. The tubes are mounted so that they can be moved toward or from each other to position them properly with respect to the eyes of the patient. In the construction shown the forward end of each tube passes through a cylindrical support or bearing-block F, sliding in a suitable transverse way or groove in a plate $f'$, mounted on the upper end of an upright post $f^2$, having a horizontal extension $f^3$, which telescopes in a tubular arm $f^4$, projecting from the supporting-standard for the instrument. A set-screw $f^5$ is provided for securing the extension in adjusted positions in the arm $f^4$. The tubes are moved toward or from each other by a double-threaded screw G, which is journaled in suitable bearings in the ends of the plate $f'$ and is provided at its opposite ends with operating-knobs $g$ for turning the screw. By turning the screw the tubes are adjusted toward or from each other, according to the direction of rotation of the screw. The distance of the axes of the tubes from each other is indicated by graduations on a bar or strip H, which is secured to one tube and slides in a bearing $h$, secured to the other tube. This bearing constitutes an index to coöperate with the graduations on the bar. The inner ends of the tubes are preferably provided with vertical plates $i$, which are guided in the transverse movement of the tubes between oppositely-arranged guides $i'$ on the front end of the box or case. Any other preferred manner of mounting and adjusting the tubes may be employed.

J represents lens-holders, which are mounted at the front ends of the sight-tubes E. Each holder is of substantially cylindrical form, having in its front wall opposite the end of the tube an eye-opening $j$ and incloses a series of lens-carrying disks or plates K. Each disk is provided with a hole or opening $k$ and a circular series of lens-openings, in which are mounted lenses $l$. The disks are rotatably mounted in the holder, so that by turning a disk the opening therein or any one of the lenses carried thereby can be brought into position in front of the tube E and opposite the eye-opening of the holder. The lens-disks and lenses are arranged in some convenient order to enable any particular lens to be placed opposite the eye-opening or any necessary combination of lenses to be formed by superposing the proper lens over each other opposite the eye-opening of the holder. For instance, one or more of the disks are provided with plus and one or more with minus spherical lenses of small designations, one or more are provided with plus and one or more with minus lenses of fractional designations, one or more disks have cylinder lenses, and one or more of the remaining disks are provided with lenses of unusual designations or with lenses for special or unusual tests. The number of the lens-disks and the number of lenses in each disk and their relative arrangement may be variously changed so long as the necessary lenses are provided and the arrangement is such that the proper combinations can be formed opposite the eye-opening of the lens-holder. In the construction shown the lens-disks are mounted on a central shaft or pin $m$ in the holder. The lens-disks are preferably provided with notches in their peripheries, in which are adapted to engage springs $m'$, secured to the lens-holder opposite the disks. This provides a suitable means for releasably holding each disk after it has been turned to bring a desired lens opposite to the eye-opening of the holder. Each disk is also provided on its periphery with characters to indicate the positions of the lenses in the disk. The lens-holder is provided with a peripheral opening to enable the operator to reach and turn the lens-disks.

In order to ascertain axis of the astigmatic error or defect of the eyes, the lens-holders are mounted so as to turn about the axes of the tubes E, so as to change the relative axial position of the lenses opposite the eye-opening of the case. For this purpose the lens-holders are provided with eccentrically-arranged rearwardly-projecting tubes or sleeves N, which are opposite to the eye-openings and loosely surround the forward ends of the tubes E. Preferably the sleeves pass through the bearing-blocks for the tubes and constitute the bearings proper for the front ends of the tubes E. To indicate the angle to which the lens-holder is turned, the stationary bearing for the tube and lens-holder is provided with graduations $o$, with which coöperates an index or pointer $p$, secured to the rear end of the sleeve of the lens-holder.

To make the reading or near test, the post carrying the support for the lens-case bearings is moved forwardly away from the box or case to disengage the sleeves on the lens-holders from the tubes E. After the lens-holders are moved forwardly to disengage them from the ends of the tubes E they are turned around at an angle to the tubes, so that an object can be held opposite the sleeves of the lens-holders and be viewed by the patient looking through the lenses in the holder. To enable the lens-holders to be thus turned, the plate supporting the same is provided with a depending boss $q$, which is rotatably supported in the upper end of the post $f^2$ and held from disengagement therefrom by a suitable screw or other device.

I claim as my invention—

1. The combination of a case having a sight-tube provided with projecting-lenses whereby an object in the case can be viewed, a lens-holder provided with a lens and movably mounted at one end of said tube whereby the lens-holder can be moved to place its lens in line with said tube or direct the lens away from said tube toward an object, substantially as set forth.

2. The combination of a case having a sight-tube provided with projecting-lenses whereby an object in the case can be viewed, a lens-holder at one end of said tube, a lens-carrier movably mounted on said lens-holder and provided with lenses adapted to be placed in axial alinement with said tube, and means for movably supporting said lens-holder whereby it can be moved to direct the lenses away from said tube toward an object, substantially as set forth.

3. The combination of a case provided with a screen, a tube mounted at one end of said case and provided with projecting-lenses, a lens-carrier provided with lenses and mounted at one end of said tube and adapted to be moved to place said lenses in axial alinement with said tube, and a holder for said lens-carrier movable relative to said tube whereby said lenses can be directed toward an object, substantially as set forth.

4. The combination of a case provided with a screen, a tube mounted at one end of said case opposite to said screen and provided with projecting-lenses, a lens-holder mounted at the end of said tube, lens-disks provided with lenses and movably mounted in said holder to place said lenses opposite to said tube, and a support for said lens-holder which is movable away from said tube, substantially as set forth.

5. The combination of a tube provided with projecting-lenses, a lens-holder mounted at the end of said tube, lens-disks movably mounted in said lens-holder and provided with lenses adapted to be moved into alinement with said tube, said lens-holder being movable longitudinally and angularly relative to said tube, substantially as set forth.

6. The combination of a case, a light-screen therein, tubes arranged opposite to said screen and provided with projecting-lenses, lens-holders mounted eccentrically at the ends of said tubes and rotatable about the axes of the latter, lens-disks movably mounted in said lens-holders and provided with lenses, means for moving said lens-holders longitudinally relative to said tubes, and means for permitting said lens-holders to be turned laterally relative to said tubes, substantially as set forth.

Witness my hand this 13th day of October, 1902.

ROBERT K. GROVE.

Witnesses:
    T. H. GROVE,
    J. THAYER.